US008897930B2

(12) United States Patent
Bayer

(10) Patent No.: US 8,897,930 B2
(45) Date of Patent: Nov. 25, 2014

(54) MOTOR CONTROLLER

(76) Inventor: Janice Ilene Bayer, Seaford, VA (US)

( * ) Notice: Subject to any disclaimer, the term of this patent is extended or adjusted under 35 U.S.C. 154(b) by 356 days.

(21) Appl. No.: 13/192,445

(22) Filed: Jul. 27, 2011

(65) Prior Publication Data

US 2012/0018574 A1 Jan. 26, 2012

Related U.S. Application Data

(63) Continuation-in-part of application No. 11/885,388, filed as application No. PCT/US2006/007404 on Mar. 1, 2006.

(60) Provisional application No. 60/657,633, filed on Mar. 1, 2005.

(51) Int. Cl.
*B64C 25/00* (2006.01)
*G05D 1/00* (2006.01)
*G06F 17/00* (2006.01)
*B64C 25/40* (2006.01)
*G05D 1/02* (2006.01)

(52) U.S. Cl.
CPC ............. *B64C 25/405* (2013.01); *Y02T 50/823* (2013.01); *G05D 1/02* (2013.01)
USPC ........ 701/3; 701/41; 701/42; 701/43; 701/44; 701/120; 318/580; 318/583; 318/639; 318/400.07; 318/400.15; 244/75.1; 244/103

(58) Field of Classification Search
USPC .......... 701/3, 41–44, 120; 318/569, 580, 583, 318/600, 606–610, 635, 639, 400.07, 318/400.15, 727; 244/75.1, 103
See application file for complete search history.

(56) References Cited

U.S. PATENT DOCUMENTS

| | | | | |
|---|---|---|---|---|
| 3,977,631 | A * | 8/1976 | Jenny | 244/50 |
| 6,046,560 | A * | 4/2000 | Lu et al. | 318/432 |
| 2005/0007044 | A1* | 1/2005 | Qiu et al. | 318/254 |
| 2006/0065779 | A1* | 3/2006 | McCoskey et al. | 244/100 R |
| 2007/0101721 | A1* | 5/2007 | Dooley et al. | 60/721 |
| 2007/0158497 | A1* | 7/2007 | Edelson et al. | 244/103 S |
| 2007/0282491 | A1* | 12/2007 | Cox et al. | 701/3 |
| 2010/0276535 | A1* | 11/2010 | Charuel et al. | 244/50 |

* cited by examiner

*Primary Examiner* — Jack W Keith
*Assistant Examiner* — Chuong P Nguyen

(57) ABSTRACT

This application describes the software invented to control an electric motor system. The electric motor system is mounted on one or more aircraft main wheels or nose wheels to drive an aircraft independently on the ground without aircraft engines or tow vehicles. The software uses closed-loop control together with several other control laws to operate the drive motor or motors. Knowledge of the current operating state of the drive motor, together with knowledge of the commands given to taxi forward, taxi in reverse, or brake in reverse, is used to configure the motors to optimal operating parameters. The software architecture is described along with the pilot interface and many details of software implementation.

20 Claims, 5 Drawing Sheets

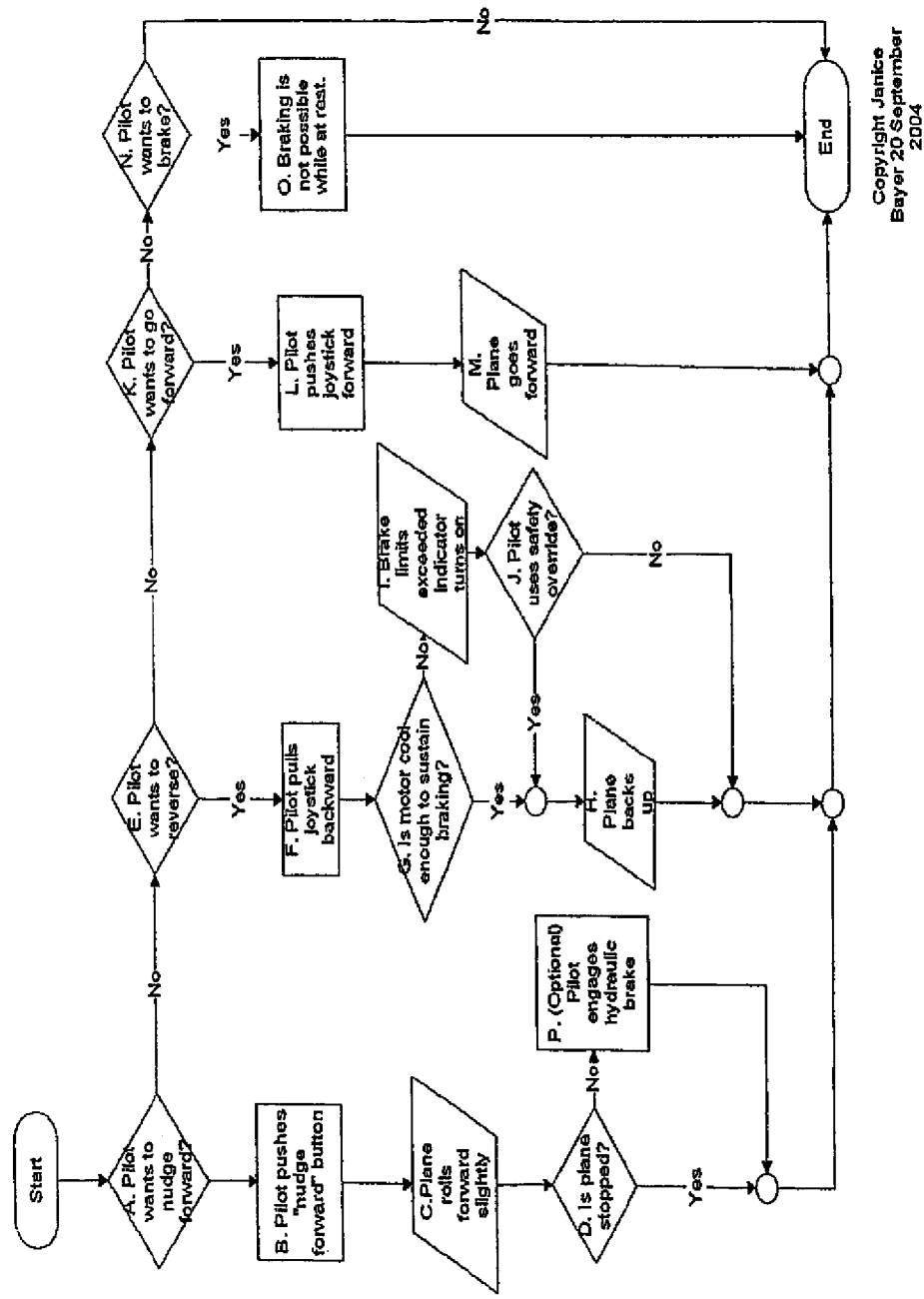

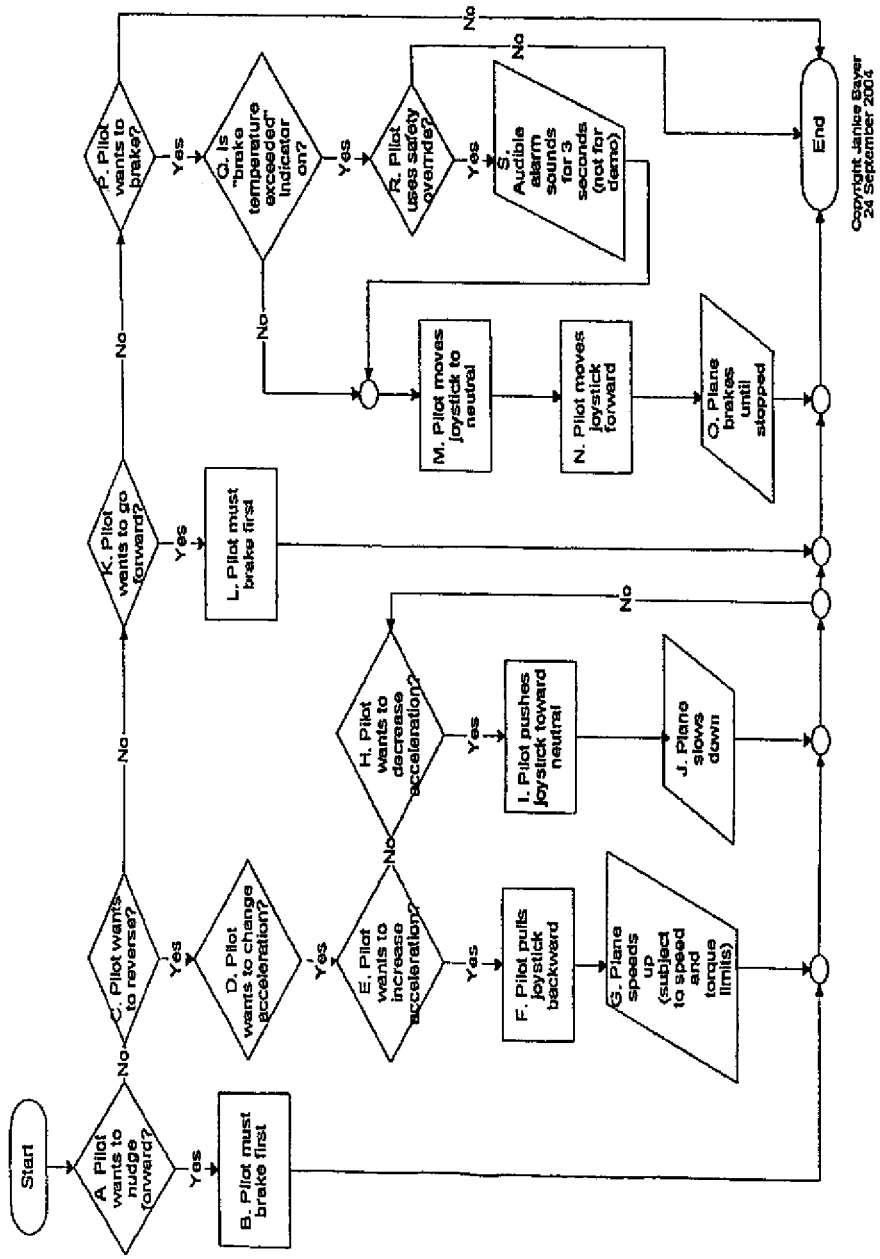
Figure 3 – Options available from reverse.

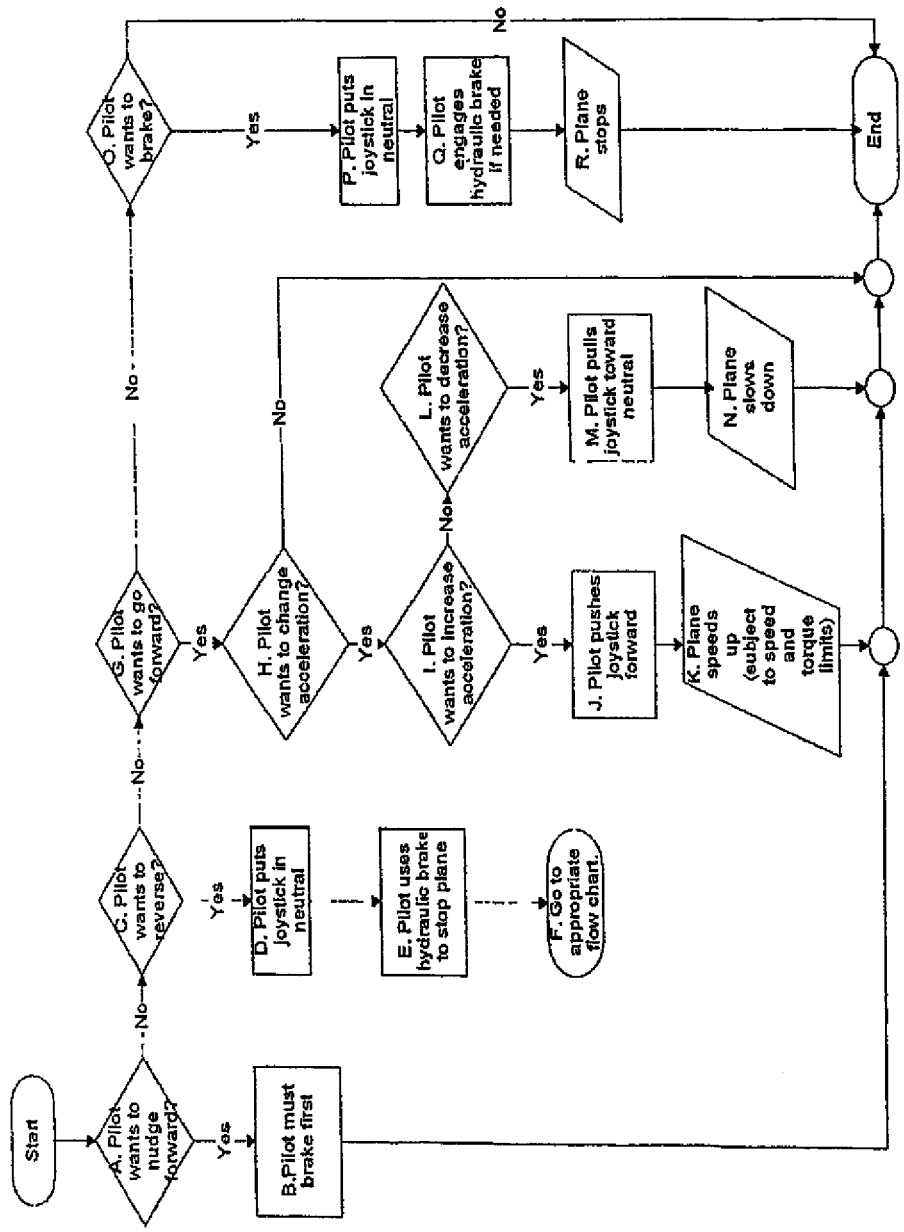
Figure 4 - Options available from forward taxi

MOTOR CONTROLLER

This application is a continuation-in-part of U.S. patent application Ser. No. 11/885,388, filed on Aug. 29, 2007, and PCT Application No. PCT/US/2006/007404 filed on Aug. 29, 2007, and based on U.S. Provisional Patent Application No. 60/657,633, filed on Mar. 1, 2005

TECHNICAL FIELD

This invention relates generally to a motor control system and specifically to a motor control system designed to control one or more motors mounted on an aircraft drive wheel to move the aircraft independently on the ground without the use of engines or tow vehicles.

BACKGROUND ART

In U.S. Pat. Nos. 6,657,334 and 6,831,430, a high phase order induction machine drive system is disclosed. This has an inverter system for the synthesis of a plurality of phases of alternating current output, and an N-phase induction motor (N is greater than 3). The motor is connected to the inverter terminals in the following way: each motor phase is electrically connected to two inverter terminals: a first inverter terminal and a second inverter terminal L inverter terminals distant from the first inverter terminal in order of electrical phase angle (L is the span number). The phase angle difference between the pair of inverter terminals to which each motor phase is connected is identical for each motor phase.

In WO03/092150 several polyphase devices are connected together: an inverter, and electrical rotating machine, and a resistive load or braking resistor. The purpose of the resistive load is to dissipate excess electrical power which may be produced when the inverter acts to slow down the rotating machine, causing the rotating machine to act as a generator. In common art, this resistive load is a single DC resistor coupled to the DC link of the inverter via a separate resistor control transistor. Here, the resistive load is a mesh connected array of resistors, and is electrically connected to the same inverter output terminals that the rotating machine is connected to. When it is desired that the resistors absorb energy, for example from a braking operation, then the harmonic content of the inverter output is adjusted, thus placing voltage differences across the resistor array and causing current to flow in the resistors.

Currently, aircraft either use a tug or use the main engines to taxi. Use of the main engines consumes fuel in a more-or-less inefficient manner, creates pollution (atmospheric and noise), and reduces the effective payload and/or the operating range of an aircraft. Use of a tug reduces pilot control, increases operating costs, and adds to the logistical complexity of airport operations.

DISCLOSURE OF INVENTION

The present invention is a motor control system that controls the operation of a drive motor mounted on an aircraft wheel. The motor is controllable to propel an aircraft on the ground independently of the aircraft engines or tow vehicles. The motor control system effectively controls the operation of a drive motor mounted to drive any of the aircraft's landing gear wheels and functions as effectively on the main landing gear wheels as on the nose landing gear wheels. At least one electric drive motor is contemplated for use with the present motor control system. The system is particularly suitable for controlling two high phase order induction machine drive systems of the type disclosed in U.S. Pat. Nos. 6,657,334 and 6,831,430 mounted to drive two aircraft main wheels or nose wheels.

The motor control system controls the electric drive motor during aircraft taxi and ground travel. The approach uses several algorithms and control laws to operate the motors. Knowledge of the current operating state of the motors, together with knowledge of the commands given to taxi forward, taxi in reverse, or brake in reverse, is used to configure the drive motor or motors to optimal operating parameters. A method of controlling the torque output of an aircraft drive wheel motor is also provided.

Technical advantages of the present invention include: allowing the aircraft to taxi at an airport without the use of main engines or a tug; reducing fuel costs, pollution and noise levels; increasing payload capacity and/or range; and placing aircraft completely under pilot control thereby saving money and simplifying logistics.

BRIEF DESCRIPTION OF DRAWINGS

For a more complete explanation of the present invention and the technical advantages thereof, reference is now made to the following description and the accompanying drawings, in which:

FIG. 2 shows pilot interface for drive options when the aircraft is at rest;

FIG. 3 shows pilot interface for drive options when the aircraft is in reverse;

FIG. 4 shows pilot interface for taxiing options when the aircraft is moving forward.

BEST MODE FOR CARRYING OUT THE INVENTION

Figure 1A:
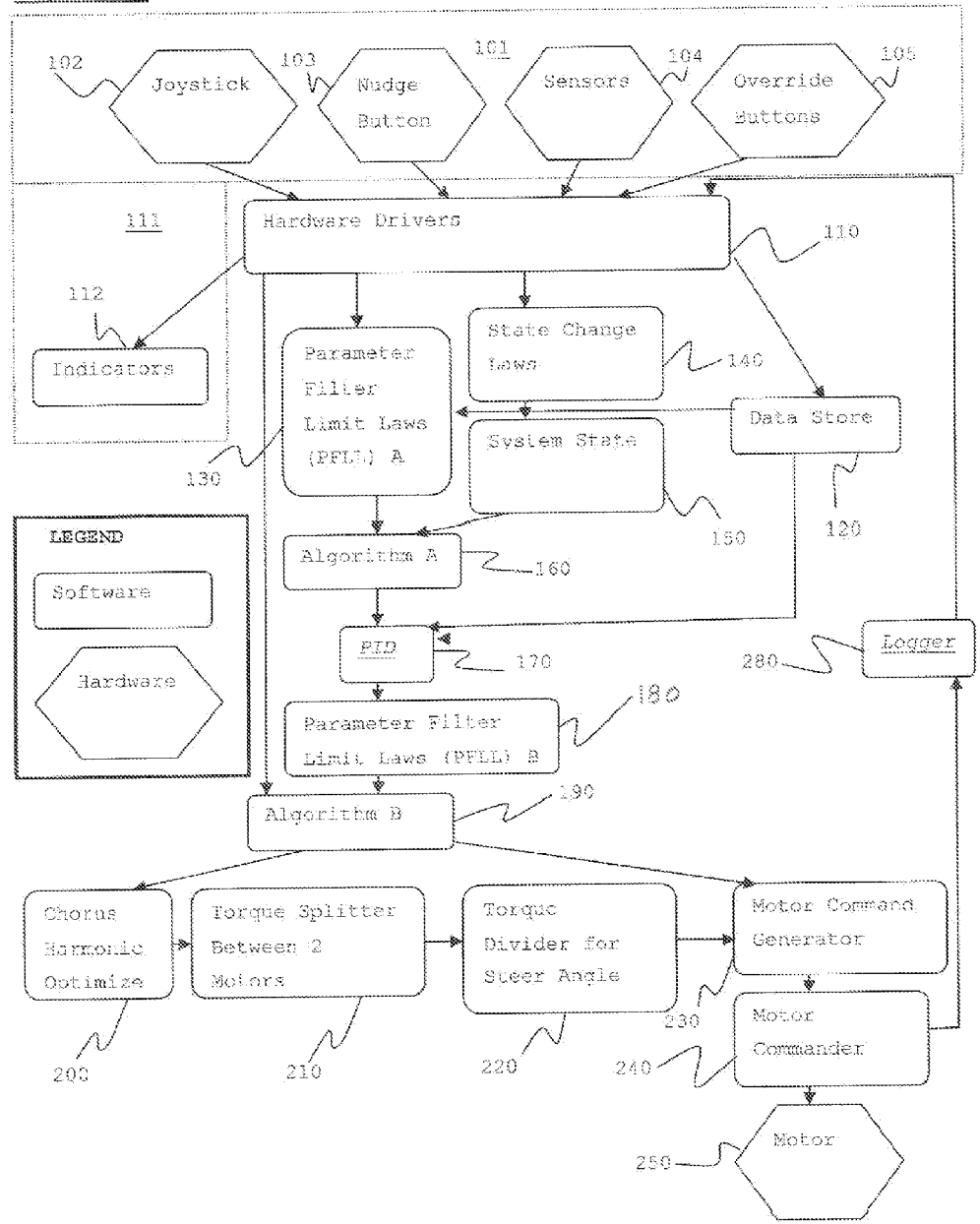
FIG. 1a shows a schematic of the present invention.

Referring now to FIG. 1a, a schematic of one preferred embodiment of the present invention is shown. A Pilot Interface includes various Input Devices 101 to provide input for the control system. Input Devices 101 include, but are not limited to, Joystick 102, Nudge Button 103, Sensors 104, and Override Buttons 105. Input Devices 101 allow the pilot to perform a number of actions, which may include but are not limited to: pull joystick forward; pull joystick backward; return joystick to neutral position; "nudge" forward; and safety override of motor heating actions.

Hydraulic brakes are an independent, mechanical, control input device that a pilot may use to stop or steer the wheels. Hydraulic brakes work independently to the electronic motor control system. It is nevertheless necessary that a reading of the hydraulic brake position should be made available to the software. In addition, a registration of a command to brake applied to the motor control software, may be activated by the motor control software operating the hydraulic brakes. However for safety it is anticipated that the hydraulic brakes should also incorporate a separate, overriding control mechanism from the motor control system.

Nudge Button 103 activates the Nudge command. The Nudge command is anticipated as being used to release wheel blocks from the aircraft. The software includes an Operational Profile for performing the Nudge command. The Operational Profile for Nudge includes commanding the motor to exert a certain, configurable degree of torque, to cause the wheels to turn by a configurable portion of a turn. This releases the wheels from the wheel blocks. After this, the torque is immediately dropped to zero, and the pilot has the option of using the hydraulic brake if the aircraft has not stopped. The Operational Profile for other commands may be also instituted. If no Operational Profile has been associated with a certain command, the Operational Profile would simply be to attempt to fulfill that command, for example, to provide the exact torque commanded by the Joystick.

The Pilot Interface also includes Notification Devices 111, for notification and feedback for the pilot, etc. These may include but are not limited to: indicators 112, for example LEDs, and audible alarms. Notification Devices 111 may inform the pilot of, for example, the following notifications: temperature out-of-bounds feedback; system stop feedback. In addition, Notification Devices 111 may overlap with Input Devices 101. For example, Override Button 105 or Nudge Button 103 may have an "RS-232" output that could 'latch' the fact that they were pushed, until cleared by software.

Joystick 102 refers to the input device used to request a degree of power for the aircraft. It may have power commands scaled differently for forward and reverse. Joystick 102 is a commonly used device for registering a pilot's power request. However, Joystick 102 may be replaced by any other module that allows a user to register power requests. In autopilot mode, the module would be replaced by a software program registering power requests. If used for testing or if the system is operated by remote control, Joystick 102 might be replaced by or may additionally incorporate a terminal interface and a command handler, incorporating command files. All these and similar power requesting devices have been referred to in the present specification as Joystick 102.

Similarly, "buttons" are referred to as being pushed in by a user, in order to request certain conditions, for example, "Override Button 105". Instead of being separate "buttons", these devices may simply be part of Joystick 102, or part of an autopilot software system, or other devices or switches able to input a message that a certain condition is requested. For simplicity however, these are referred to as "buttons". Buttons have the benefit in that one is often able to register that a request has been made, for example, by designing the button to remain pushed in until manually released, or released by software. However if another device is used, a different method of registration of the request can easily be substituted, for example, an LED may light up. In general, for the pilot interface, all software and hardware, in isolation or combination, known in the art for these purposes, is acceptable for use with the present disclosure.

Sensors 104 include any type of measuring device commonly used to determine needed information for the control system. These may include, but are not limited to: temperature of motor windings sensors, rotor position sensors, dc rail voltage, strut torque sensor(s), current sensor(s), speed sensors, steering angle sensors.

Data from devices 101 is received by Hardware Drivers 110. Hardware Drivers 110 calculate needed information from each device based on the device output and a defined relationship, for instance a calibration, between that output and the needed information. All Input Devices 101 and Notification Devices 111 require a driver of some sort, the driver being simply software dedicated to translating a physical input from an Input Device 101 to a meaningful number like speed in the unit of choice (meters/second). A sensor typically provides an analog output like a current or a voltage, which is then connected to appropriate physical lines to the microprocessor or computer. In a preferred embodiment, sensors 104 are each fitted with a meter that translates the sensor output to a serial digital format. The meters are then connected to the serial ports of the PC-104. This makes the design of the drivers simpler, although the digital data from the meters often must still be interpreted by Hardware Drivers 110. The data typically includes a start character so that Hardware Drivers 110 know which byte is the beginning of a piece of data, then the data itself, then an end character or characters. Then the data are translated according to sensor specifications, e.g. "2.5 volts equals zero speed".

In a simple embodiment, at the start of a main control loop, the Hardware Drivers 110 for each of the Input Devices 101 are polled by the main thread. In a further embodiment, the Hardware Driver 110 for each Input Device 101 is polled by a dedicated thread at a high rate. When a dedicated thread encounters a change in the device variables, the dedicated thread notifies the main thread by sending a message. The main thread checks for messages and responds to them when they are present. This approach overcomes potential time overheads in the main thread having to poll each device. Typically each device will provide ASCII-based serial data, as this approach reduces the code requirements for hardware drivers 110.

Data from Hardware Drivers 110 in a first embodiment is accessed by the main thread directly from each Hardware Driver 110. In a preferred embodiment however, all data is stored in a central location, Data Store 120. Data Store 120 stores updated values for common variables, enabling many classes along the main thread to access the variables. Data Store 120 includes, for example, the current motor FPGA parameter settings (EXCT, PERD, etc.), rotor speed and direction, parameters calculated from sensor readings, etc. In the course of the current disclosure, it is assumed that all updated data from Hardware Drivers 110 are stored as device variables in Data Store 120 and accessed directly from there, although the invention should not be construed as limited in any particular way.

Commonly used software protocols are not described in the course of the specification, and are used as needed. For example, in many cases, the code implementation checks all calculated parameters, both final and intermediate, for overflow before proceeding to the next step.

As part of the main thread, Parameter Filter Limit Laws (PFLL) A 130 are applied to the device variables of Data Store 120. Parameter Filter Limit Laws A 130, as well as Parameter Filter Limit Laws B 180, are software protocols, to filter variables for speed, torque, current etc. based on real-world constraints. If any variables fall outside the acceptable limits, a warning or corrective action is provided. For example, if the inverter current is too high, or the motor is too hot, the motor would be automatically controlled to go into DC braking, which reduces the current, unless the Override Button has been pushed. Parameter Filter Limit Laws (PFLL) A 130 include a first set of laws for noting and preventing against unsafe or unacceptable conditions based mainly directly on the variables themselves. The conditions that PFLL A 130 are targeted against may include, but are not limited to, conditions such as the voltage or current of the motor are too high, or a torque request input by Joystick 102 is too high, or the temperature of Motor 250 is too high, etc. If any data fall outside the acceptable limits, a warning or corrective action is provided.

State Change Laws 140 are applied to the device variables in order to determine the current operational state of the system. State Change Laws 140 determine when a State Change is required based on the current state and current variables. State Change Laws 140 also flag anomaly conditions.

State Change Laws 140 are required because commands from certain Input Devices 101 may represent more than one different function, dependent upon the state of the system at the point in time during which the request was made. Also, for various parameters required at later stages of processing, it is necessary for the system to determine which state is currently operational. State Change Laws 140 provide mappings between the device variables, and various predetermined states.

System State 150 is a snapshot of the operational state or states that the aircraft is currently operating in. States may include but are not limited to: forward motion, reverse motion, brake from forward motion, brake from reverse motion, at rest, nudge, steer degree, manual override. Some states may be mutually exclusive of other states, others may overlap. For example, the aircraft may be moving forward and be turning at a certain steering angle at the same time.

System state 150 also records whether any anomalies have been encountered and not cleared. It should be noted that the state reflects the actual aircraft state of motion, regardless of what has been commanded via Joystick 102 or other means. The appropriate reaction to any pilot command or sensor reading depends upon the current state. For instance, pushing Joystick 102 forward means "forward" if the aircraft is at rest, but may mean "brake" if the aircraft is moving in reverse.

System State 150 may also note the aircraft speed and direction. In preferred embodiments, two motors are used, and the speed may be taken as the average of the two rotors. An average speed of zero, within some deadband, means the aircraft is at rest. It should be noted that if the pilot steers while the aircraft is at rest, the rotor of one motor will turn in the forward direction and the rotor of the other will turn in the reverse direction. This should still be interpreted as the aircraft being at rest.

Algorithm A 160 is the first calculation stage. This requires two inputs, the device variables, and the determined operational states from System State 150. In addition, some operational states may be linked to specific operational profiles, for example, as mentioned before, the Nudge Command has a specific Operational Profile. These Operational Profiles are also input to Algorithm A 160 during times when System State 150 indicates the operational state that they are linked to.

Algorithm A 160 represents a closed loop control algorithm. Performance data that will be used may include, but is not limited to: rotor speed, drive frequency and drive voltage, for each motor. If preferred, the motor drive current can be additionally be used for verification, or it can be unused. The output of Algorithm A 160 is the torque request. The torque request results from the joystick and button inputs, or from a command file replacing a pilot console, while taking into account the System State 150. Algorithm A 160 may be substituted with any other determination method, such as calculation or look up table. For example, Lookup Table 1 including pre-calculated values may be substituted. For simplicity, all these methods of determining are referred to as "algorithms".

There are two basic ways that the aircraft may be driven: open or closed loop control. With open loop control, a pilot or autopilot makes an approximate speed or torque request. The pilot would normally modify a speed or torque request as the aircraft moves. This is analogous to driving other vehicles, in which a driver presses on the gas pedal, and the variations in pedal position control the torque of the motor. The speed of the vehicle depends on the motor output torque, as well as on the system speed and inertia at the time.

With closed loop control, a user is able to input specific values of speed or torque that he requests from the motor. This is a considerably more complicated control mechanism, as far as the software is concerned. With closed loop speed control, the control system calculates for the user how much torque the motor needs to apply in order to reach the requested speed or torque. Closed loop speed control is likely to be desirable when the aircraft is unmanned or using autopilot. Closed loop torque control is anticipated as preferred for a closed loop manual drive. In both types of closed loop control, it is the job of the control system to control the motors to substantially meet the exact speed or torque requested. The control system operates according to adjustable tolerances, to control the speed or torque of the machine, according to predetermined parameters relating to rate of change.

PID controllers 170 may be used to provide closed loop control. PID controllers 170 take information about the torque request or speed level, and direction, from Data Store 120, about the current system state from System State 150, and about the actual motor torque output from the output of Algorithm A 160. In pseudocode, the output of a PID controller 170 can be described according to the following equation. The Error is the difference between the output requested and the actual output. The Gain terms are chosen in accordance with the expected behavior of the system, and are changeable variables.

$$\text{Output} = (\text{Proportional\_Gain} * \text{present\_Error}) +$$
$$(\text{Integral\_Gain} * \text{accumulated\_Error}) +$$
$$(\text{Derivative\_Gain} * \text{change\_in\_Error})$$

In the present invention these Gains and Errors allow either the motor torque or the rotor speed to be subject to control at any given time. In the normal case there should not be significant short-term fluctuations in either one of those parameters. However, an anomaly causing a large derivative can occur in the case of one or both wheels slipping. Although it is necessary to measure wheel slippage, it would not be desirable to use the data produced by the slipping anomaly as feedback into the controller. Therefore, in a preferred embodiment, the control system uses a separate control law to monitor wheel slip, and PI controllers are used instead of PID controllers 170. This is very common in practice, where derivative control is not often used.

In a preferred embodiment, a Torque PI controller is used when the airplane is moving forward, whereas a Speed PI controller is used when the aircraft is moving in reverse, since it is often more important to move slowly and control the speed in reverse. When moving forward, there is a maximum speed set as a 'filter', but this is applied after PI controller is executed. In a further preferred embodiment, only Torque PI controller is used, for both forward and reverse, and maximum speed restrictions are applied after Torque PI controller is executed.

The accumulated Error is the sum of a certain number of past Errors plus the current Error. One of the design choices is the number of samples to use in calculating the accumulated error. In a preferred embodiment, a user-defined variable determines the amount of time over which to calculate the accumulated Error. The number of controller iterations per second is a variable quantity. Therefore, the number of samples used in the accumulated Error is a calculated quantity. In a preferred embodiment, the number of samples used is the samples accumulated in one second.

There are "deadband" values for each PI or PID controller 170. The deadbands, or tolerances, are acceptable Errors in speed or torque. If the Errors are small enough (within the deadband), then there will be no change in the output of the controllers. Deadbands are used to avoid small oscillations. Deadbands may have adjustable tolerances.

Parameter Filter Limit Laws B 180 are implemented by the software to the output of Algorithm A 160, (the torque request) or to the output of the PID controllers 170, if these are used. In general, these laws place limits on parameters of interest. In several cases, the application of these laws depends on the state, i.e., whether the aircraft is moving forward, backward, braking, etc, accessed from System State 150. In a preferred embodiment, PFLL B 180 are implemented by tables resident in the software, to track parameters of interest, and the limits for each. Each parameter limit represents a control law, and some may be adjustable by a user. Exceeding limits on inverter current, inverter voltage, individual motor speed or torque, and speed differences between the two motors will cause the software to take corrective action.

Algorithm B 190 takes as inputs the rotor speed and the torque request, and provides the drive frequency and voltage as outputs.

Chorus Harmonic Optimizer 200 is used if the motor is a high phase order (HPO) motor. Chorus Harmonics Optimizer 200 determines which harmonic or harmonic blend should be used for driving a high phase order motor. This determination depends on the number of phases of Motor 250, as well as the span of the mesh connection. The mesh connection span is normally fixed for each Motor 250. Chorus Harmonics Optimizer 200 may have a standard harmonic that is superimposed upon the fundamental to a varying degree or may be able to use one or more of a selection of harmonics superimposed on the fundamental, to provide the specific torque level being requested. Chorus Harmonics Optimizer 200 further determines how much of the harmonic and of the fundamental should be used. Chorus Harmonic Optimizer 200 takes as input the outputs of Algorithm B 190, as well as the phase current and inverter voltage. The act of switching between fundamental and higher-harmonic operation or superimposing a higher order harmonic on the fundamental frequency waveform may also occur via a specific procedure that Chorus Harmonic Optimizer 200 is designed to control.

Torque Splitter between two motors 210 is required when Motor 250 consists of two stator-rotor combinations. Each stator-rotor combination is connected to at least one of two nose wheels or to at least one main wheel of an aircraft, and each stator-rotor combination is supplied with drive electronics. It is necessary that both stator-rotor combinations, a.k.a. motors are designed to output the same torque during regular taxi, so that the aircraft does not veer in one direction or the other, and also to reduce motor wear and tear.

Torque Divider for Steer Angle 220 is required when using two motors to steer the aircraft. Alternatively, a manual device may be used to steer the aircraft on the ground, such as hydraulic brakes applied differentially. Torque Divider for Steer Angle 220 redistributes the torque to be applied by each of the two motors, so that one motor turns relative to the other, and the aircraft is steered accordingly. In more complex embodiments, Torque Divider for Steer Angle 220 may apply a current to one motor to cause the motor to be stationary, or to operate in reverse, to speed up the turn.

Motor Command Generator 230 takes the new drive frequency and voltage for each motor from Algorithm B 190, and produces excitation, RPAI, and FPGA parameters etc. The FPGA parameters are the lower-level commands required for Motor 250 to operate.

Motor Commander 240 formats the lower level commands from Motor Command Generator 230 into serial, discrete or parallel format, as required, according to the connection with Motor 250, for example, via RS-232 links.

Motor 250 may be any type of motor capable of producing high torque outputs. In a preferred embodiment it is an induction motor, or other electric motor capable of high torque outputs.

Motor 250 is used to apply drive to the any of the wheels, but preferably to the nose wheel of the aircraft. The motor 250 may be situated within at least one main wheel or nose wheel of the aircraft, attached to the axle. In a preferred embodiment, motor 250 is composed of two motors, each driving one of two main wheels or nose wheels. In a particularly preferred embodiment, the two motors each drive one of the two nose wheels, and the motors are high phase order machines.

High phase order motors have the benefit of being able to tolerate harmonics up to the phase count, and use these as beneficial torque for the motor. This represents a gain in efficiency. In addition, a high phase order motor that has mesh connected windings (as opposed to a star connection), has the following benefit: operation with different harmonics of the fundamental frequency drive waveform changes the magnetic field structure developed by the current through the motor windings. This can drastically change the impedance of the machine. Usually, operation with the fundamental frequency drive itself is preferred, as it is most efficient. However, if the fundamental cannot provide the requested torque at the present speed, then one or more harmonics would be added—superimposed or substituted, as necessary to achieve the required torque. The limit on harmonic current available depends on the voltage available from the main supply, and the amount of fundamental being used.

Motor 250 includes an inverter for processing the lower level commands into timed electrical pulses. In a preferred embodiment, Motor 250 also includes a Graceful Stopper, as a safety device. The Graceful Stopper is set to note when no new commands are received by Motor 250 from Motor Commander 240, over a predetermined stretch of time. This would indicate that signal connection between motor 250 and the rest of the command system has been lost. When lost signal connection is noted, the Graceful Stopper acts to slow the motor to a gradual stop.

Logger 280 keeps a log of the operation of the system. It records updated operating parameters and pilot commands to all Input Devices 101. Logger 280 may also log such aspects as changes in System State, e.g. Taxi Forward, Reverse. In addition, Logger 280 may keep a record of all Out-of-Bounds Sensor Readings, recording details such as which sensor had the Out-of-Bounds reading, the time when that reading took place, what the reading was, and the boundary limit at the time. In addition, Logger 280 may record commands received from a terminal interface. Logger 280 may additionally be able to record the time and possibly the cause of actions of the Graceful Stopper.

Figure 1B:
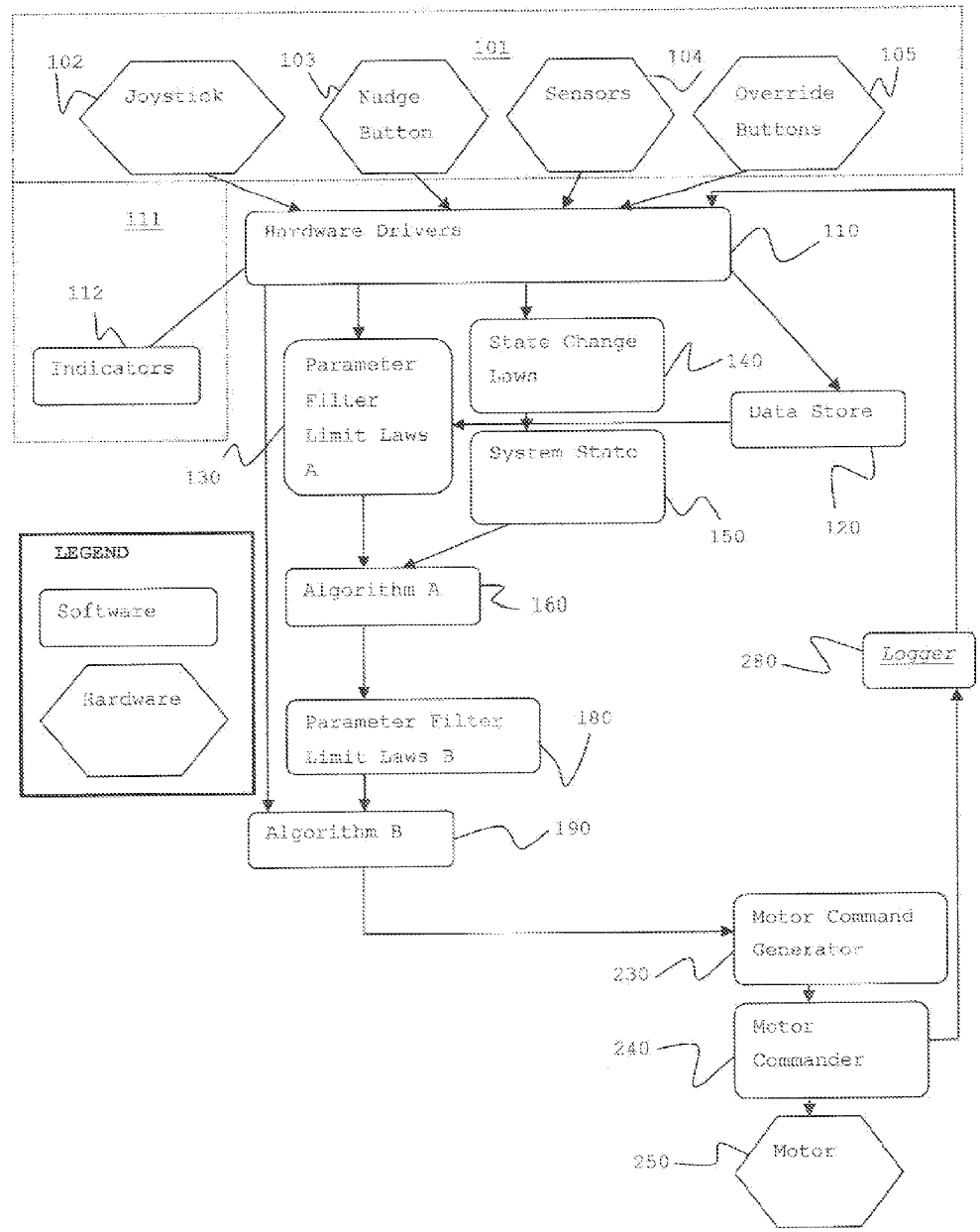
FIG. 1b shows a schematic of a simplified version of the present invention.

Referring now to FIG. 1*b*, a schematic is shown of a simplified version of the present invention. Input Devices 101 are connected to Hardware Drivers 111. Input Devices 101 include sensors and torque command inputs. Hardware Drivers 110 calibrate readings from sensors and commands from Input Devices concerning requested torque, to produce device variables. State Changes Laws 140 are applied to the device variables to determine an operational System State 150. PFLL A 130 are applied to the device variables, to check for out-of-bounds conditions, such as overheating. In addition, they filter the commanded torque, speed or current, in light of the operational System State 150, for unacceptably high or low levels that represent out-of-bounds conditions. Correction of these conditions may include be that the commanded torque is filtered to a more acceptable level, and an indicator may be used to notify the pilot.

Algorithm A 160 takes System State 150, and the device variables. Algorithm A 160 outputs the appropriate torque request. The torque request is later addressed by Algorithm B 190.

PFLL B 180 are then applied to the torque request output of Algorithm A 160, to check for further out-of-bounds conditions. PFLL B 180 relate to conditions such as maximum speed and maximum acceleration. If a torque request is unacceptable, corrective action is taken. This may include notification. The corrective action preferably includes filtering the torque request to a filtered torque request that does not produce an out-of-bounds condition. The corrective action may be overridden by the pilot pushing the override button.

Algorithm B 190 performs a further calculation, taking the rotor speed and filtered torque request to determine a new motor drive frequency and voltage.

Motor Command Generator 230 takes the output of Algorithm B 190, and produces parameters such as excitation, RPAI, etc, essentially the lower level commands for operation of the motor. Motor Commander 240 formats the commands from Motor Command Generator 230 into a serial, discrete or parallel format, according to the communication format with the motor. Motor 250 includes a stator-rotor combination, plus drive electronics, for example, an inverter. The inverter receives the lower level commands and applies electrical current to the motor. Motor 250 outputs the torque request allowance. Preferably, the Motor 250 includes a Graceful Stopper for reducing the torque gradually to zero in the event that communication with the rest of the system is lost.

In operation the system functions as follows: For each pass through the main loop, perform the following operations in the order written. Get new sensor readings. Check for out-of-bounds on selected parameters (eg temperature, voltage, current, acceleration, and wheel slip). If corrective action is necessary, take the corrective action and restart the main loop. Otherwise, using the sensor readings and input from the joystick and buttons, check for required changes of state per pilot commands. Execute Algorithm A 160 to find the correct torque request. Check whether the torque request would generate out-of-bounds conditions on rotor speed, regeneration, or change in rotor speed. If corrective action is necessary, take it and restart the main loop. If no corrective action is necessary, proceed. Use Algorithm B 190 to determine the voltage and frequency to apply to the motors. Apply control law limits in order to filter the output requests. These limits will include maximum acceleration and maximum speed, maximum excitation, and others. Calculate the lower-level commands for the motor using the Motor Command Generator, and send the commands using the Motor Commander to the Motor.

In one embodiment of the invention, the control system is implemented as follows:

The firmware runs on two platforms.
i) The ATMega128 microprocessor is a component on the main electronics board which is a standard part of the Chorus motor-inverter combination.
ii) The PC-104 based computer runs most of the code including the PID control.
1) The processor is an Intel Pentium running at 700 MHz.
2) The operating system is Linux Red Hat Version 9.
   The main PC-104 stack components are:
3) Main CPU board: KONTRON 01029-0000-70-1 preferably utilizing a Pentium CPU;
4) RS-232 Serial Communications Board: Emerald-MM-8 EMM-8m-XT 5) Power Supply: http://www.diamondsystems.com/products/he104
6) hard disk: standard laptop, IBM travelstar
7) The software is implemented in C++.

With reference now to FIG. 2, a control system user interface and associated software for a pilot to drive an aircraft on the ground by controlling a motor system and a hydraulic brake driving one or more aircraft main wheels or nose wheels, includes a choice of options from stationary:
(i) A pilot request to nudge forward (A), is activated by pushing a designated button (B), causing the aircraft to roll forward slightly (C), and if the aircraft does not come to a complete halt thereafter (D), the pilot is able to engage a hydraulic brake to halt the aircraft (P)
(ii) A pilot request to reverse (E) is activated by the pilot moving the joystick in a first direction, such as backwards (F), and if the motor is cool enough to sustain braking (G), the aircraft reverses (H), and if an indicator indicates that the motor system is not cool enough to sustain braking, indicated by a brakes limits exceeded indicator turned on, (I), then only if the pilot also registers a safety override of the indicator (J), will the aircraft reverse (H).
(iii) A pilot request to taxi forward (K) is activated by the pilot moving the joystick in a second direction, such as forwards (L), and aircraft moves forward (M).
(iv) A pilot request to brake (H) is not accepted (O).

With reference now to FIG. 3, a control system user interface and associated software for a pilot to drive an aircraft on the ground by controlling a motor system and a hydraulic brake driving one or more aircraft main wheels or nose wheels, includes a choice of options from reverse:
(i) A pilot request to nudge the aircraft forward (A) is not accepted until the pilot has braked (B).
(ii) A pilot request to reverse (C), with changed acceleration (D)—with increased acceleration (E) is activated by the pilot moving the joystick in the first direction, such as backwards (F), and has an effect that the aircraft reverses with increased acceleration, that is, it speeds up, with the increased acceleration is subject to software governed speed and/or torque limits (G). A pilot request to reverse with decreased acceleration (H) is activated by the pilot moving the joystick in the second direction, such as forwards, towards but not necessarily reaching a neutral position (I), and has an effect that the aircraft reverses with decreased acceleration, that is, slows down (J).
(iii) A pilot request to brake (P) when the indicator indicates that the motor system is not cool enough to sustain braking (Q), is not accepted until the pilot overrides the indicator (R), and overriding the indicator causes a notification such as an audible alarm to sound (S). However the pilot request to brake (P) when the indicator does not indicate that the motor system is not cool enough to sustain braking, (Q), or when the indicator is overridden (R), is preferably activated by a series of two actions, the first action is the pilot moving the joystick to a neutral position (M) and the second action is the pilot moving the joystick in the second direction, for example, forwards (N), which causes the aircraft to stop (O). In addition, the pilot may operate the hydraulic brakes.

With reference now to FIG. 4, a control system user interface and associated software for a pilot to drive an aircraft on the ground by controlling a motor system and a hydraulic brake driving one or more aircraft main wheels or nose wheels, includes a choice of options from forward taxi:
(i) A pilot request to nudge forward (A) is not accepted until the pilot brakes (B),
(ii) A pilot request to reverse (D) is not accepted until the pilot brakes, for example by the pilot moving the joystick to neutral (D) and applying the hydraulic brakes to stop the aircraft (E), after which the pilot may use any of the options available from stationary, as shown in FIG. 2 (F).

(iii) A pilot request to change acceleration of forward taxi (G) includes a pilot request taxi forwards with increase acceleration (I), and this is activated by the pilot moving the joystick in the second direction, such as forwards (J), and has an effect that the aircraft taxis forward with increased acceleration, in which the increased acceleration is subject to software governed speed and/or torque limits (K). A pilot request to taxi forward with decreased acceleration (L) is activated by the pilot moving the joystick in said first direction, towards but not necessarily reaching the neutral position (M), and has an effect that the aircraft taxis forward with decreased acceleration, that is, slows down (N).

(iv) A pilot request to brake the aircraft (O) is activated by the pilot moving the joystick to the neutral position (P) and is optionally further activated by the pilot engaging the hydraulic brake (Q), and these activations cause the motor system to exert zero torque and either the electric motor control system or the hydraulic brakes to stop the aircraft (R).

The motor control system in one embodiment enables electronic braking. The control system controls braking from reverse taxi in the following way: The joystick is used in one direction, for example backwards, to command the aircraft to do reverse taxi. Yet in order to brake the reverse taxiing aircraft, the command is activated by the pilot moving the joystick in a second direction, for example, forwards. This commands the electric current to go in the forward direction. Although the rotor is turning backwards, the motor current is working against it, which is how the braking action occurs. However, in order to subsequently move the aircraft forwards, as a design choice, the joystick will not register a joystick moved forwards as a command to go forwards, since it is also being used as the command to brake from reverse taxi. The moving of the joystick forwards while the aircraft is currently moving backwards only registers a braking command. In order to actually then move the aircraft forwards, the driver must do an additional action, such as move the joystick temporarily to neutral again, or push a button, in order to be able to use the joystick to command torque to then move the aircraft forwards. Electric braking of the wheels is similarly possible from forwards taxi, by commanding the current to reverse, although forwards taxi is likely to include faster travel, and thus hydraulic brakes may be the brake of choice.

A typical protocol for approaching a terminal gate in reverse involves (see FIGS. 2 and 3):
a) Nudge Button Enables Wheel Blocks to be Removed
b) Joystick Commands Torque Requirement
c) Control System Commands Torque Sharing (avoids Hydraulic Steering Conflicts)
d) Normal Back Up Stop by Electric Motor Reversal
e) Software Attempts to Prevent any unwanted outcomes
f) Limit Back Up Top Speed to safe speed for solely hydraulic emergency stop
g) Limit Back Up Acceleration to avoid tipping A typical protocol for taxiing involves (see FIG. 4):
a) Joystick Commands Torque Requirement
b) Control System Commands Torque Sharing (avoids Hydraulic Steering Conflicts)
c) Max Forward Speed Limited to −15 MPH
d) Wheel Scrub and Slip Controlled by Speed Differential Limits
e) Max Torque Demand Limited by Acceleration Limits
f) Software to be used to prevent any unwanted outcomes The above description should not be taken as limiting the scope of the invention in any way, which should be determined by the appended claims.

INDUSTRIAL APPLICABILITY

Thus it will be apparent that the present invention has utility in a number of respects, including: allowing an aircraft to taxi at an airport without the use of main engines or a tug; reducing fuel costs, pollution and noise levels; increasing payload capacity and/or range; and placing aircraft completely under pilot control thereby saving money and simplifying logistics.

The invention claimed is:

1. An aircraft motor control system for controlling a drive motor associated with at least one aircraft wheel to drive the aircraft independently on the ground from a stationary state or in a selected forward or reverse direction without the use of the aircraft main engines in accordance with one or more selected operational states, wherein said motor control system comprises:

(a) at least one electrically powered high phase order drive motor mounted within at least one aircraft wheel, said drive motor comprising a stator-rotor combination configured to generate a requested wheel torque or speed in response to one or more operational states to drive said at least one aircraft wheel, and drive electronics electronically connected to said stator-rotor combination;

(b) a pilot interface operationally connected to said drive motor comprising a plurality of input devices and a plurality of notification devices designed to overlap with said input devices, wherein each of said input devices is configured to actuate a power command to generate said requested wheel torque or speed to drive the at least one aircraft wheel and move the aircraft in a selected forward or reverse direction in accordance with a selected operational state;

(c) sensors associated-with said input device, said notification devices, said at least one aircraft wheel, and said at least one drive motor adapted to provide information relating to a selected operational state;

(d) hardware drivers electronically connected to said input devices and said sensors adapted to calibrate power commands and information from said sensors to produce input device variables; and (e) a control loop electronically connecting said hardware drivers, said sensors, said input devices and said at least one drive motor, wherein said control loop comprises, system state change laws and means for applying the state change laws to determine a current aircraft wheel operational state, first parameter filter limit law (PFLL) means for filtering input device variables according to a first set of out-of-bounds conditions, first calculation means to determine a wheel torque or speed request to apply to the at least one drive motor in accordance with filtered input device variables, second parameter filter limit law (PFLL) means for filtering the determined torque or speed request, second calculation means to determine a motor drive frequency and motor voltage to produce the filtered wheel torque or speed request, motor command generator means for producing lower level commands to drive the drive motor based on determined motor drive frequency and motor voltage, and motor commander means for formatting said lower level commands for said drive motor, wherein said drive electronics are adapted to supply electric power to the stator-rotor combination in accordance with said lower level commands to drive said at least one aircraft wheel at a torque or speed requested to move the aircraft in accordance with a selected operational state.

2. The control system of claim 1, wherein said sensors are selected from the group comprising temperature of motor windings sensors, rotor position sensors, DC rail voltage sensors, strut torque sensors, current sensors, speed sensors, and steering angle sensors.

3. The control system of claim 1, further comprising a correction system for taking corrective action when either set of out-of-bounds conditions is exceeded, and said correction system comprises means to override a power command that represents an out-of-bounds condition with a power command that does not represent an out-of-bounds condition.

4. The control system of claim 1, wherein said system comprises two nose wheels and two electrically powered high phase order drive motors, each drive motor mounted within a nose wheel and comprising one of said stator-rotor combination, one, and each stator-rotor combination is supplied with drive electronics, wherein said motor command generator is adapted to provides a set of lower level commands for each stator-rotor combination.

5. The aircraft motor control system described in claim 4, further comprising a torque splitter, whereby torque requested in response to a selected one of said operational states is shared between said two aircraft nose wheels.

6. The aircraft motor control system described in claim 4, wherein said input devices comprise means for registering a requested nose wheel steer angle, and further comprise means to distribute the torque request between the two nose wheel drive motors according to the requested steer angle.

7. The control system of claim 1, wherein said drive motor comprises at least one stator-rotor combination mounted within at least one main wheel configured to generate a requested main wheel torque in response to a selected one of said one or more operational states, and said at least one stator-rotor combination is connected to said drive electronics, wherein said motor command generator or motor commander provides a set of lower level commands for said at least one stator-rotor combination to move said aircraft in response to a selected operational state.

8. The control system of claim 7, wherein two stator-rotor combinations are connected to two aircraft main wheels.

9. The control system of claim 8 further comprising a torque splitter to divide the wheel torque request to share torque between the two drive motors.

10. The control system of claim 9 wherein said input devices comprise means for registering a requested main wheel steer angle, and further comprise means to distribute the main wheel torque request between the two drive motors according to the requested nose wheel steer angle.

11. The control system of claim 7, wherein said high phase order drive motor comprises more than three different phases and has mesh connected windings.

12. The control system of claim 11 wherein said drive motor further comprises a harmonics optimizer for determining a harmonic drive frequency based on a requested wheel torque.

13. The system of claim 1, wherein said selected operational states comprise stationary, forward motion, reverse motion, and nudge mode.

14. A method for controlling drive motors mounted within one or more aircraft wheels to drive an aircraft independently on the ground in a selected forward or reverse direction or from a stationary state without the use of the aircraft main engines in accordance with one or more selected operational states comprising:

(a) providing an electrically powered high phase order drive motor mounted within one or more aircraft wheels comprising a stator-rotor combination configured to generate a requested wheel torque or speed in response to a selected operational state to drive said one or more aircraft wheels, and providing drive electronics electronically connected to said stator-rotor combination;

(b) providing a pilot interface operationally connected to said drive motor comprising a plurality of input devices and a plurality of notification devices designed to overlap with said input devices, and configuring each of said input devices to actuate a power command to generate the requested wheel torque or speed to drive the at least one aircraft wheel and move the aircraft in accordance with a selected operational state when a pilot of said aircraft activates an input device;

(c) providing sensors adapted to provide information relating to said selected operational state, and measuring and storing selected parameters relating to operation of said electrically powered high phase order drive motor when a pilot of said aircraft activates an input device to move the aircraft in accordance with a selected operational state;

(d) providing hardware drivers electronically connected to said input devices and said sensors, and calibrating power commands to move the aircraft in accordance with a selected operational state from information received from said sensors and measured and stored selected parameters;

(e) providing a control loop electronically connecting said hardware drivers, said sensors, said input devices, and said drive motor comprising system state change laws and means for applying the state change laws to determine a current aircraft wheel operational state, first parameter filter limit law (PFLL) means for filtering input device variables according to a first set of out-of-bounds conditions, first calculation means to determine a wheel torque or speed request to apply to the drive motor in accordance with filtered input device variables, second parameter filter limit law (PFLL) means for filtering a determined torque or speed request, second calculation means to determine a motor drive frequency and motor voltage to produce the filtered wheel torque or speed request, motor command generator means for producing lower level commands to drive the drive motor based on determined motor drive frequency and motor voltage, and motor commander means for formatting said lower level commands for said drive motor; and (f) activating an input device to actuate a power command to generate the requested wheel torque or speed based on information provided by the sensors and measured and stored parameters, thereby actuating the control loop to determine a torque or speed request for an operational state, filtering the torque or speed request according to parameter filter limit laws to produce a filtered torque or speed request, determining a motor drive frequency and motor voltage required to produce the filtered torque or speed request, and commanding a supply of electric power to the drive motor according to the determined motor drive frequency and motor voltage to drive said one or more aircraft wheels at a torque or speed requested to move the aircraft in accordance with the selected operational state.

15. The method of claim 14, further comprising the following steps prior to filtering a requested torque or speed:

(a) applying a requested torque and a measured motor torque as input to a proportional integral (PI) controller;

(b) varying PI gain terms of the PI controller according to a predetermined mapping related to an operational profile of a current operational state; and (c) applying PI control to provide a closed loop torque request to said control loop.

16. The method of claim 15 wherein when said selected operational requires the aircraft to move in reverse, said PI controller controls motor speed and wherein when said selected operational requires the aircraft to move forward, said PI controller controls motor torque.

17. The method of claim 14, further comprising measuring and storing selected parameters related to operation of said electrically powered high phase order drive motor selected form the group comprising: measuring drive motor temperature, measuring rotor position, measuring a DC rail voltage, measuring torque of a strut supporting one or more wheels that house a drive motor, and measuring electrical currents supplied to said drive motor.

18. The method of claim 14, comprising providing two electrically powered high phase order drive motors mounted within two aircraft wheels, and further comprising measuring and storing selected parameters related to operation of said electrically powered high phase order drive motor for said two motors and deriving an average of the selected parameters of said two motors.

19. The method of claim 14, further comprising determining a current operational state by
(a) providing a set of state laws outlining characteristics of a plurality of operational states; and
(b) comparing stored parameters with the set of state laws to determine the current operational state.

20. The method of claim 19, wherein providing a set of state laws outlining characteristics of a plurality of operational states comprises differentiating between forward motion, reverse motion, stationary, and nudge mode.

* * * * *